United States Patent [19]
Bach et al.

[11] 4,170,400
[45] Oct. 9, 1979

[54] WIDE ANGLE VIEW OPTICAL SYSTEM

[76] Inventors: Bert Bach, 270 West End Ave., New York, N.Y. 10023; Eliot S. Gerber, 7 Frog Rock Rd., Armonk, N.Y. 10504

[21] Appl. No.: 812,493

[22] Filed: Jul. 5, 1977

[51] Int. Cl.² ............... G02B 5/17; G03B 21/00
[52] U.S. Cl. ............... 350/96.25; 350/19; 350/27; 350/181; 353/70; 355/52
[58] Field of Search ............ 350/96.25, 96.27, 96.24, 350/181, 19, 27; 355/52; 353/69, 70

[56] References Cited
U.S. PATENT DOCUMENTS

| | | | |
|---|---|---|---|
| 2,122,750 | 7/1938 | Nicolson | 350/96.25 |
| 2,244,235 | 6/1941 | Ayres | 350/198 |
| 3,142,235 | 7/1964 | Siegmund | 350/96.25 |
| 3,770,909 | 11/1973 | Rose et al. | 350/96.18 |
| 3,864,017 | 2/1975 | Cole | 350/96.25 |

*Primary Examiner*—Stewart J. Levy
*Attorney, Agent, or Firm*—Eliot S. Gerber

[57] ABSTRACT

An optical system for cameras and projectors includes a reflective convex mirror for a wide-angle view, for example, a sector of one fourth of a sphere to obtain a view of 180°. The optical system further includes a front face reflecting mirror to change the optical path 90°, a first focusing lens, a fiber optic bundle and a second focusing lens. The fiber optic bundle has one face in the form of an annulus or sector of an annulus and the opposite face of rectangular shape so that an annular shaped image may be converted into a non-distorted image of rectangular form.

17 Claims, 10 Drawing Figures

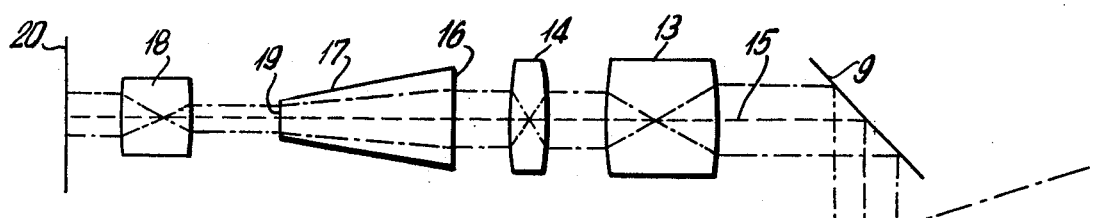
FIG. I
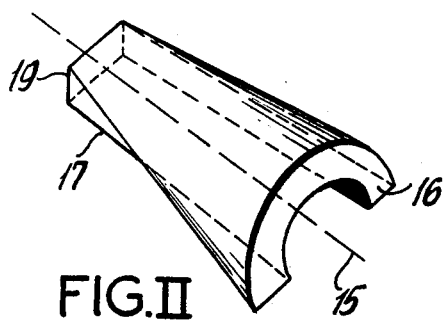
FIG. II
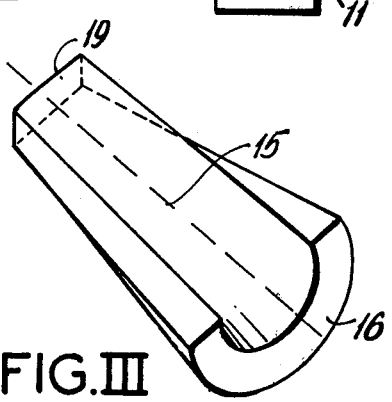
FIG. III
FIG. IV
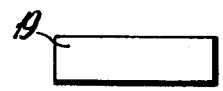
FIG. V
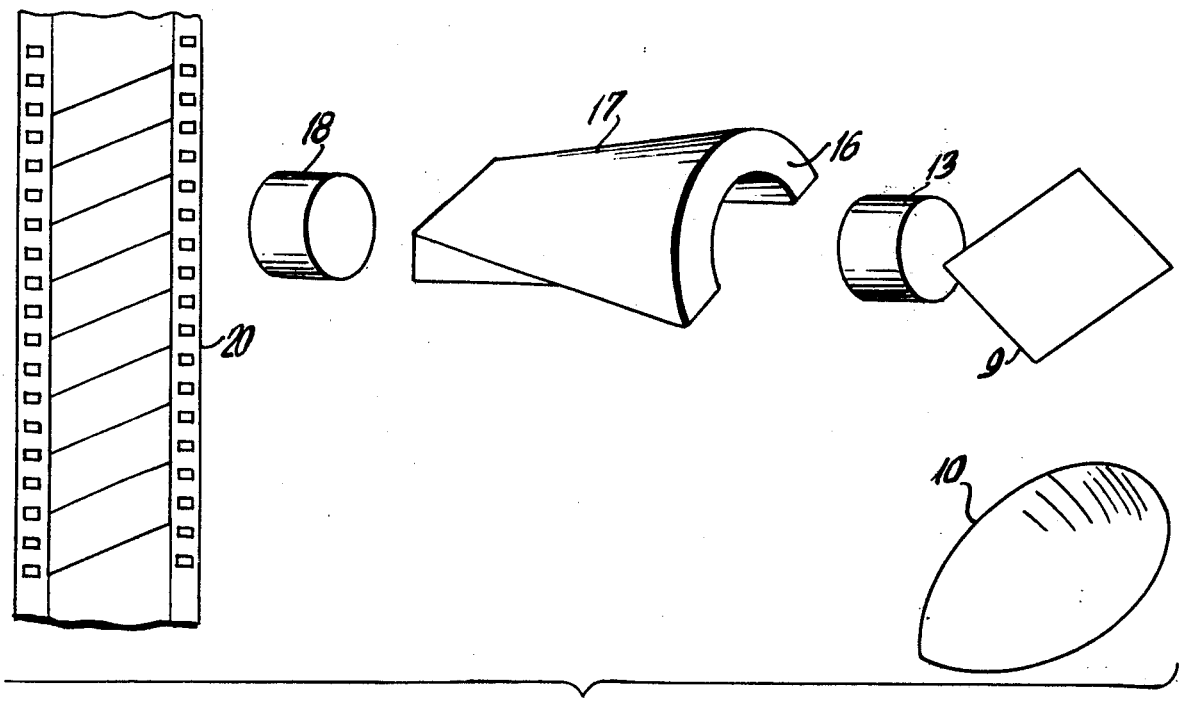
FIG. VI

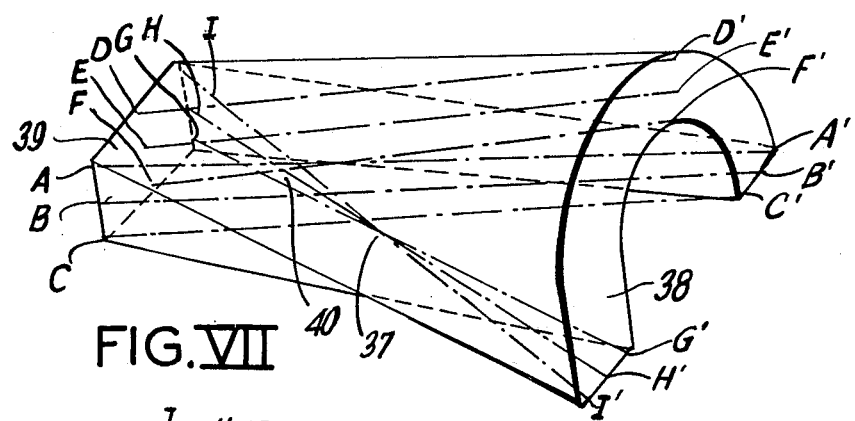
FIG. VII
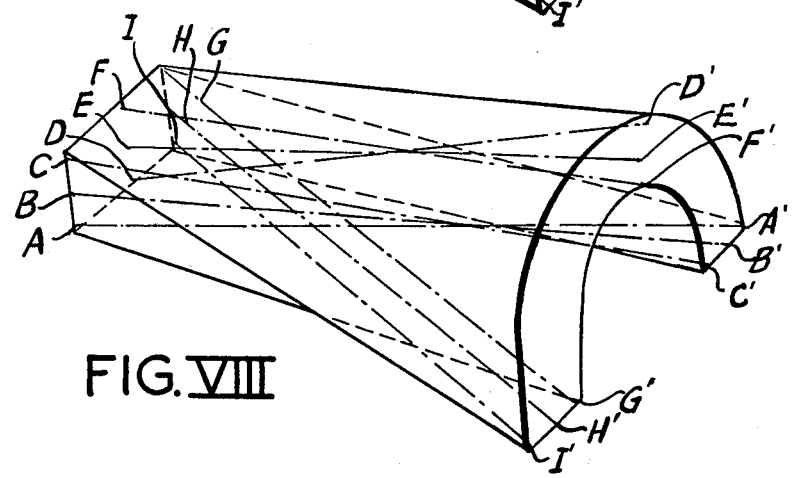
FIG. VIII
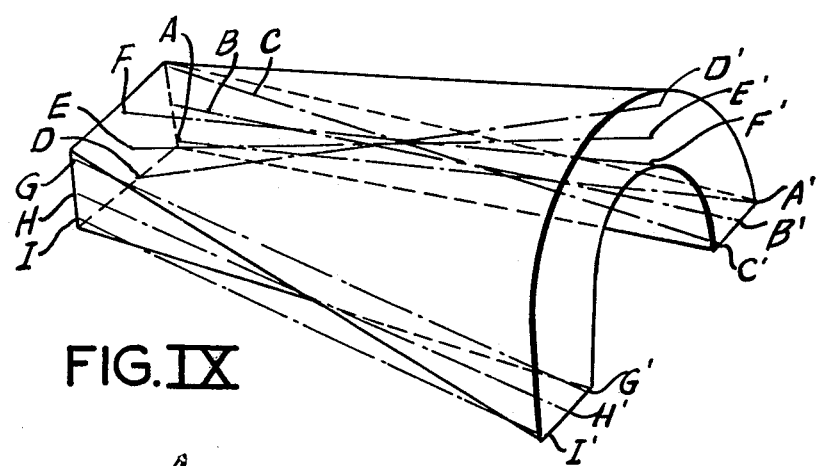
FIG. IX
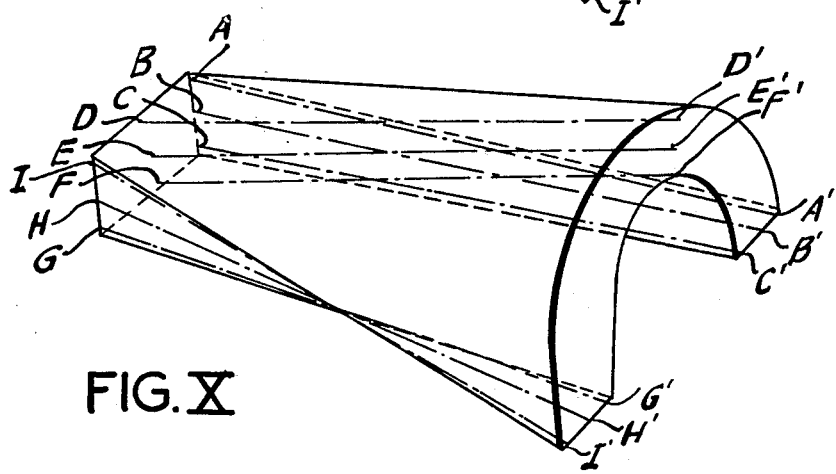
FIG. X

WIDE ANGLE VIEW OPTICAL SYSTEM

BACKGROUND OF THE INVENTION

The present invention relates to the field of motion picture cameras and motion picture projectors, and more particularly to optical systems for such cameras and projectors which obtain a wide angle of viewing and projection.

There has been a number of suggestions in the past for motion picture camera systems which would provide a wide angle of viewing. For example, it is possible to construct camera lenses and projection lenses which provide a viewing angle of about 50° to 70°, although in some of these lenses there is considerable distortion near the outer edges of the viewing screen. It has also been suggested and implemented that a number of motion picture cameras may simultaneously and in synchronism take pictures with the cameras positioned to cover the entire desired wide-angle field, for example, a field of 180° or 360°. If the desired field is 180° and each camera takes a maximum of 45°, then it is required to utilize four cameras whose mechanisms are operated in synchronism. Subsequently, in projection, the four separate films are projected separately each through its own projector, and the projectors arranged at an angle to each other to cover a 180° screen. The projectors are run in synchronism and attempts have been made to have their images overlap to avoid the problem of lines appearing between each of the images.

In conventional motion picture projection the screen has a ratio of width to height of 1.33:1. It has been suggested that an anamorphic lens system be used in front of the conventional camera lens to produce a squeezed wide angle picture which fits into a standard 35 mm move picture frame. Another anamorphic lens is then used for projection and the film is projected on a screen having a width-height ratio of 2.66:1. That system may give a horizontal field of about 70 degrees compared to the normal field of 40°, but presents a squeezed image which is difficult to edit.

A different type of system is shown in the Ayres U.S. Pat. No. 2,244,235, dated June 3, 1941 entitled "Cyclormic Optical System." In the Aygres patent the image from a 360° scene, having reference to the horizontal, is obtained on the bottom portion of a reflective ball element. That image is transmitted through a focusing lens and recorded on a conventional motion picture film. The image on the film, as shown in FIG. 4 of that patent, is a circle having a central aperture. The film image is distorted and would be extremely difficult, if not impossible, to edit using conventional techniques. The film image may subsequently be projected using a similar system, that is, it is projected from the film through a lens and onto a ball element. The Ayres system, in addition to its film being difficult to edit, also presents serious problems in film-making. The camera is positioned horizontally, which makes it difficult to handle using conventional film camera stands and film camera handling techniques.

A somewhat similar system is shown in U.S. Pat. No. 2,299,682 to J. S. Conant, issued Oct. 20, 1942. In the Conant system the reflective ball element, instead of being a hemisphere, is a convex parabolic reflector. The Conant patent utilized a curved screen for projection, which is a hemispherical screen or which is a small section of a relatively large diameter sphere.

In still cameras it is known that a "fisheye" lens may cover a wide angle of 180° or more. However, the image is extremely distorted and in some lenses may be described as establishing the relationship between cubival angle and area size of images in equisolid angle projection. A "super wide angle lens" is available from 15 mm to 25 mm. For example, an 18 mm 3.5 lens has been announced by ZUIKO (Olympus, Tokyo, Japan) having a 100° angle of view and 12 lens elements. A still camera standard wide angle lens has an angle of view of about 50°.

SUMMARY OF THE INVENTION

In accordance with the present invention an optical system is provided which may be utilized in a camera such as a motion picture projector. When used in a motion picture camera the optical system provides an extremely wide angle of view, for example, from 100° to 360°.

The optical system of the present invention includes a convex mirror which reflects a wide angle of view. For example, the convex mirror may be one-quarter of a sphere to reflect a wide angle of 180° and may be a hemisphere to reflect a wide angle view of 360°. The image from the mirror is then reflected from the front face of a front face flat mirror which changes the optical path 90°. The reflection from the front face mirrors passes through a first focusing lens which is utilized to focus the image on a fiber optic bundle. The front face of the fiber optic bundle is flat and consists of a complete annulus (for 360° of wide angle view) to a sector of an annulus, for example, one-half of an annulus for a 180° wide-angle view. The fiber optic bundle comprises a large number of individual clad glass optic fibers in a coherent and fused bundle. The opposite face of the fiber optic bundle is also flat and, when viewed along the optical axis, is rectangular in shape. This permits the image of the curved surface, which is annular in shape, to be changed from its annular shape to a rectangular shape. The image from the opposite face of the fiber optic bundle is focused by a second focusing lens and preferably is reversed by a reversing lens and focused on a film gate, in the case of a motion picture camera. The image produced on the film at the film gate is rectangular in shape and, compared to the conventional more or less square rectangle, it has less height and is more elongated. That image is a non-distorted rectangular image which lends itself to editing using conventional film editing techniques.

The film having the aforesaid described rectangular image may either be projected on a standard screen using a conventional motion picture projector, if film, or a slide projector, if a still slide. Alternatively, it may be projected using such projectors and, in addition, using the optical system of the present invention and a curved screen. In a case where the projection is of the rectangular image without the projector's use of the optical system of the present invention, the image projected would be an undistorted flat rectangular image which may be shown on conventional screens and would produce a wide angle of view. For example, if one wishes to use a conventional type of motion picture screen and a conventional film projector, one could put three or four screens side by side to accommodate the wide-angle view of the film, the film being made possible by the optical camera system of the present invention.

Alternatively, one may use the optical system of the present invention to project an image from the rectangular film image on the film on a curved screen, the film image having been produced by a camera with the optical system of the present invention. For example, the curved screen may be a 180° sector of a sphere or of a right-angled cylinder. In those cases the projector would be at the center of the sphere or of the cylinder.

OBJECTIVES AND FEATURES OF THE PRESENT INVENTION

It is an objective of the present invention to provide a motion picture camera optical system and a motion picture projector system which will provide a single film having a wide-angle image which is at least 90 degrees and may be up to 360 degrees.

It is another objective of the present invention to provide such a system in which the image as recorded on the motion picture film will be in undistorted reverse image form as in conventional motion picture films, thus enabling the motion picture film to be edited using conventional editing techniques and apparatus.

It is a further objective of the present invention to provide such a system in which the camera may be held at the conventional horizontal position either by a camera dolly or by hand.

It is a further objective of the present invention to provide such a system in which the image on the film may occupy considerably less space on the film that conventional film images and specifically may occupy one-half, or alternatively one-quarter, of such space so that, when utilized with modified projector apparatus, a given length of motion picture film may be projected for two times or four times the duration of conventional film.

It is a further objective of the present invention to provide such a motion picture camera optical system which may be economically feasible for use with conventional professional motion picture camera equipment and which would not greatly add to the weight or the size of such equipment.

Similarly, it is a further objective of the present invention to provide a motion picture projection optical system which would not greatly add to the cost of conventional motion picture projectors and which may be readily assembled and disassembled to a conventional projector.

It is a further objective of the present invention to provide such a motion picture camera system which provides a flat and undistorted film image on the film so that conventional motion picture projectors may be used to project the image on a flat screen or a slightly curved screen.

Other objectives and features of the present invention will be apparent from the detailed description which follows of the inventors' presently best known mode of practicing the invention.

BRIEF DESCRIPTION OF THE DRAWINGS

The detailed description of the present invention should be taken in conjunction with the accompanying drawings.

In the drawings:

FIG. I is a side plan schematic view illustrating the elements of the first embodiment of the optical system of the present invention in which a reversing lens is utilized as one of the elements;

FIG. II is a perspective view of the fiber optic bundle utilized in the optical system of FIG. I;

FIG. III is a second perspective view of the same fiber optic bundle as shown in FIG. II;

FIG. IV is a front plan view of an enlarged scale of the fiber optic bundle shown in FIGS. II and III;

FIG. V is a rear end view of the fiber optic bundle shown in FIGS. II and III;

FIG. VI is a side plan schematic view of the optical elements of an alternative embodiment of the optical system of the present invention which does not utilize a reversing lens.

FIGS. VII–IX are perspective views of alternative fiber optic bundles which invert or reverse an image; and FIG. X is a perspective view of the fiber optic bundle used in the system of FIG. I.

DETAILED DESCRIPTION OF THE INVENTION

The motion picture optical system is exactly the same, as far as their elements are concerned, as the motion picture optical projection system.

As shown in FIG. I of the application, the motion picture camera optical system of the present invention includes a reflective curved mirror 10 whose curved surface 11 reflects a wide angle of view. As shown in FIG. I, the curve is a one-quarter sector of a sphere and consequently the reflected view is of an angle of 180°. Alternatively, and not shown, the curved mirror 10 may be a hemisphere and reflect the entire 360° view. It will be understood that by utilizing different sized segments of a sphere or other suitable curve, the angle of view may be readily determined.

The image, shown by optical path 22, which is reflected on the curved surface 11 is viewed by the mirror 9. The mirror 9 is a front surface flat mirror which reflects to change the optical path 90°. For this purpose the mirror 9 is positioned at a 90° angle relative to the vertical axis of the curved mirror 10. A first focusing lens 13 is positioned in the optical path so as to focus the image reflected from the mirror 9. The focusing lens 13 will reverse the image and bring it into a sharp focus. A reversing lens 14 is next positioned along the optical axis 15 so as to again reverse the image.

The image from the reversing lens 14 is focused on the flat front end plate 16 of a fiber optic bundle 17. The optical fiber bundle is an image conduit and a preferred version of that optical fiber bundle, suitable for a wide angle view of 180°, is shown in FIGS. II through V. A second focusing lens 18 is positioned to receive the image from the back face plate 19 on the film plane (film gate) 20. The details of the film gate and the mechanism to hold the film and advance the film may be conventional and are not described herein in detail.

"Fiber optics" is a term describing the image conduit, which is manufactured of thin cylindrical glass fibers of high optical quality. A single fiber, resembling a strand in a spider web, may be from 2 to 100 microns in diameter, but preferably is about 4–6 microns in diameter. Light entering one end of the fiber is transmitted to the other end by total internal reflection, with the transmission of a 10-inch length being between 60% to 90%. This percentage of transmission is somewhat affected by wave length but is substantially flat in the wave length band from 0.400 micron to 1.4 micron.

A large number of fibers are gathered together to form a non-flexible bundle; for example, a suitable bundle would be one inch in diameter. The fibers of the bundle are bonded together and an optical clear plastic may be used to pot or glaze the fiber bundle. Each fiber is clad (insulated) with a glass coating having a lower refractive index than the refractive index of the fiber itself, the coating preventing light leaking from one fiber to another. The coating, called "cladding," results in every fiber constituting a core which is completely enclosed in its own clad. For example, the core may have a refractive index of about 1.62 and the cladding a refractive index of about 1.52. The entire bundle of fibers is encased in a stiff plastic or aluminum tubing to prevent the crushing or severe bending of the fibers. Each fiber is located in a precise pattern identical at either end, forming an oriented or "coherent" bundle. Each fiber transmits a tiny segment of the original image so that the image formed at the entrance face of the bundle is reproduced, as a mosaic, by the image at the exit face.

As shown in FIGS. II and III, the fiber optic bundle 17 has a front face 16 which is flat in a plane which is perpendicular to the optical axis 15. The face 16, as shown in FIG. II, is one-half of a complete annulus (ring). This fiber bundle is intended for use in a system of 180° wide angle view. For a 360° view the front face would be a complete annulus (ring). The back face 19 of the fiber bundle 17 is also flat perpendicular to the optical axis. It is of a rectangular shape when viewed along the optical axis 15.

The fiber optic bundle 17 may be of a tapered form. In the tapered form a magnification of the image may be accomplished. Preferably the tapered form has the front face 16 relatively small compared to the back face 19, in a ratio of from 2:1 to 5:1. This enables the remainder of the system, namely, the reversing lens 14, the focusing lens 13, the front face mirror 9 and the spherical sector mirror 10, to be of relatively small size.

It should be noted that the fiber bundle can be tapered either way, depending on the use and configuration. Generally the fiber optic bundle will not be tapered.

The larger the fiber optic bundle (image converter) (i) the higher the transmission of light, and (ii) the greater the final resolution.

The fiber optic bundle 17 consists of a large number of individual glass fibers. Preferably each of the glass fibers is a clad fiber in the range of 2 microns to 10 microns in diameter. The individual glass fibers are formed into a fused non-flexible optical mosaic. The coherent image is formed at the front face 16 by the reversing lens 14 and forms a coherent image at the back face 19, because the fiber bundle is an image conduit. However, the shape of the image is changed. The shape of the image which comes from the reversing lens 14 is, as shown in FIG. 4, one-half of a complete annulus or ring. However, the shape of the image at the rear face 19 is rectangular. Consequently, the image received on the film plane 20 is also rectangular. That rectangular image is an undistorted image of a 180° wide angle view. The image, when recorded on film, is in an undistorted and rectangular form and may readily be edited by conventional film editing techniques.

The focusing lenses have been shown as single convex-convex lenses. But it will be understood that more complex lens arrangements may be utilized for focusing purposes, especially if color is to be filmed or projected. For example, the focusing lens may be a two-element achromatic lens or a three-element triplet anastigmatic lens (anastigmatic) or even more complex lens arrangements may be used, such as a Gauss double anastigmat.

Although the description given above has been in terms of a motion picture camera or a motion picture projector, the optical system is also adapted for use with a still camera or with a still projector, such as a slide projector. In either case the optical system of the present invention may be used (i) to produce a rectangular image on a slide, using the optical system of the present invention to take the film; or (ii) to project the rectangular image on a normal screen using a conventional slide projector; or (iii) to project the slide on a curved screen using the fiber bundle projection optical system of the present invention.

It may be suggested that the optical system of the present invention may be adapted for "wrap around" television projection viewing. It may not be possible, using a conventional 625 line TV raster, to send a picture which would be useful in the system of the present invention and also compatible with present FCC standards and present TV sets. Three alternatives would be (i) to send a wide-angle raster based upon the wide angle rectangular form of the image of the present invention, or (ii) to send the center 50° by the conventional channel and the remaining 130° (for a 180° picture) on a separate channel using compression, or (iii) to send one-half of the wide-angle raster on each one of two channels. The receiving set would utilize the optical projection system of the present invention and the TV camera would utilize the optical camera system of the present invention.

The description set forth above has been of the use of the optical system of the present invention in connection with a conventional motion picture camera. If such a camera is utilized, the image on the film would occupy only a portion of the usual image spacing. In 35 mm film the height of the actual picture frame is about 0.631 inch and the black area between each of the frames is 0.1170 inch and the pull-down per frame in the Academy system is 0.7480 inch. If it is taken that the conventional camera has a maximum view of 60° then for a wide-angle view of 180° the height of the image would be only one-third of the conventional height, although the width would remain the same. In other words, the height of the actual film image would be about 0.210 inch on the 35 mm film. It is possible to modify the conventional camera of the conventional film projector to take advantage of the unused black area in this case. This modification may be relatively simply performed by modifying the Geneva gear or other suitable pull-down gear. That conversion would change the pull-down to one-half of its conventional length. For example, in the case of the 35 mm camera and projector, the pull-down would be of 2 sprockets and 0.374 inch. The film would run longer and reels need not be changed as often as in conventional film.

In the embodiment of FIG. I the reversing lens has been shown as being between the first focusing lens and the fiber optic bundle. Alternatively, it may be positioned at other locations along the optical path, for example, between the fiber optic bundle and the film gate. Alternatively, the reversing lens may be replaced by a reversing set of prisms. The prisms present a greater problem in focusing but may make the optical system shorter in length.

In the alternative embodiment illustrated in FIG. VIII the fiber bundle, in addition to changing the shape of the image, also inverts the image. The fiber bundle 37, shown in FIG. VII, has a flat one-half annulus (ring) front face 38, a rectangular flat rear face 39 and a crossover or X-shaped portion 40 to invert the image. The fiber bundle inverted portion 40 substitutes for, and makes unnecessary, the use of a reversing lens or prism. It will produce a left-to-right image reversal on the film as in conventional films. In this embodiment a mask may be provided in front of the film gate and a normal 4-sprocket pull-down utilized. The image may be projected using a conventional film projector having a 4-sprocket pull-down and the image projected on a substantially flat wide screen, for example, of 100 feet in width and 20 feet in height.

In the embodiment of the fiber optic bundle shown in FIG. VII the image is reversed left to right but stays upright. In FIGS. VII through X the position of image point A is shown at the opposite face by A' and similarly point B corresponds to B', C to C', D to D', E to E', F to F', G to G', H to H' and I to I'. In the embodiment of FIG. VIII the image is reversed left to right and inverted (the bottom becomes the top). In the embodiment of FIG. IX the image is not reversed (left stays left) but is inverted (bottom becomes top). In the embodiment of FIG. X there is neither inversion nor reversal; the image stays in the same position.

For the projection of a full-length motion picture where several reels are projected, one could either use (i) a duplexing mirror and only one ball or sphere for image distribution. The images of two or more projectors would feed the duplexing mirror; or (ii) a fiber optic image combiner. This may be useful for projection angles over 170° as the system of one machine may get in the way of the other projector.

Another embodiment of the present invention for the purpose of resolution would be to split the image into two strips one above the other on the film. By duplexing the fiber optic bundle or image transfer system, one side of the screen may be projected from one image strip and the other side of the screen is projected from the second strip. When making the film the same duplexing method would be used. For an angle of 360° each strip would project onto 180° of the screen. As another example, a 180° view may be split into two 90° rectangular film images, one above the other, and projected side by side to reform the 180° view.

What is claimed is:

1. A camera optical system for filing a wide-angle view comprising:
   a reflective convex mirror means in which a wide angle view is reflected;
   a first focusing lens means to focus the image from said curved mirror means;
   a fiber optic bundle consisting of a plurality of fiber optic strands to conduit a coherent image, said fiber optic bundle having a front face toward said first focusing lens in the end face shape in cross-section taken perpendicular to the axis of the fiber strands of an annulus sector and a back face in the end face shape substantially of a rectangle; and
   a second focusing lens means to focus the image from said optic bundle back face.

2. A system as in claim 1 wherein said curved mirror means is a sector of a sphere.

3. A system as in claim 1 and further including reflecting means positioned in the optical path between said first focusing lens and said curved mirror means to change the optical path at about a 90° angle.

4. A system as in claim 3 wherein said reflecting means is a flat front surface mirror.

5. A system as in claim 1 wherein said fiber optic bundle is a fused tapered bundle producing a magnified image.

6. A system as in claim 1 wherein said fiber optic bundle consists of glass fibers each of which is less than 10 microns in diameter formed into a fused non-flexible optical mosaic which is an image conduit.

7. A system as in claim 1 wherein said fiber optic bundle is twisted to form an image inverter having an image rotation of 180° so that said film image is reversed.

8. A system as in claim 1 wherein said fiber optic bundle has its strands cross so that the image is reversed left to right and right to left but is not changed from upright to upside down.

9. A system as in claim 1 wherein said fiber optic bundle has its strands cross so that the image is reversed left to right and also inverted top to bottom.

10. A system as claimed in claim 1 wherein said fiber optic bundle has its strands cross so that the existing image is inverted so that it is turned upside down.

11. A projection optical system for projecting a wide angle view from a substantially rectangular film image, comprising:
    (a) a first focusing lens means to focus the image from said film image;
    (b) a fiber optic bundle consisting of a plurality of fiber optic strands to conduit a coherent image, said fiber optic bundle having a back face toward said first focusing lens in the end face shape substantially of an oblong and a front face lens in the end face shape in cross-section taken perpendicular to the axii of the fiber strands of an annulus sector; and
    (c) a second focusing lens means to focus the image from said front face of said fiber optic bundle;
    (d) a reflective curved convex mirror means to receive the image from said second focusing lens and reflect the image; and
    (e) a curved screen upon which the image from said curved mirror is projected.

12. A system as in claim 11 wherein said curved mirror means is a sector of a sphere.

13. A system as in claim 11 and further including a reflecting means positioned in the optical path between said second focusing lens and said curved mirror means to change the optical path at about a 90° angle.

14. A system as in claim 13 wherein said reflecting means is a flat front surface mirror.

15. A system as in claim 11 wherein said fiber optic bundle is a fused tapered bundle producing a magnified image.

16. A system as in claim 11 wherein said fiber optic bundle consists of glass fibers each of which is less than 10 microns in diameter formed into a fused non-flexible optical mosaic which is an image conduit.

17. A system as in claim 11 wherein said fiber optic bundle is twisted to form an image inverter having an image rotation of 180° so that said film image is reversed.

* * * * *